United States Patent
Bardin et al.

(10) Patent No.: US 10,538,643 B2
(45) Date of Patent: Jan. 21, 2020

(54) PLASTICIZER FOR ACRYLIC MASTICS AND ADHESIVES

(71) Applicants: TOTAL MARKETING SERVICES, Puteaux (FR); COATEX, Genay (FR)

(72) Inventors: Franck Bardin, Chambourcy (FR); Thorsten Bauer, Ibbenbueren (DE); Jean-Marc Suau, Lucenay (FR); Clémentine Champagne, Caluire-et-cuire (FR)

(73) Assignees: TOTAL MARKETING SERVICES, Puteaux (FR); COATEX, Genay (FR)

( * ) Notice: Subject to any disclaimer, the term of this patent is extended or adjusted under 35 U.S.C. 154(b) by 146 days.

(21) Appl. No.: 15/758,990

(22) PCT Filed: Sep. 7, 2016

(86) PCT No.: PCT/FR2016/052220
§ 371 (c)(1),
(2) Date: Mar. 9, 2018

(87) PCT Pub. No.: WO2017/042480
PCT Pub. Date: Mar. 16, 2017

(65) Prior Publication Data
US 2018/0282508 A1  Oct. 4, 2018

(30) Foreign Application Priority Data
Sep. 9, 2015 (FR) .................. 15 58383

(51) Int. Cl.
| | |
|---|---|
| *C08K 5/01* | (2006.01) |
| *C09J 11/06* | (2006.01) |
| *C09J 133/14* | (2006.01) |
| *C09J 171/02* | (2006.01) |
| *C08K 3/20* | (2006.01) |
| *C08K 3/26* | (2006.01) |
| *C09J 11/04* | (2006.01) |

(52) U.S. Cl.
CPC .............. *C08K 5/01* (2013.01); *C09J 11/06* (2013.01); *C09J 133/14* (2013.01); *C09J 171/02* (2013.01); *C08K 3/20* (2013.01); *C08K 2003/265* (2013.01); *C09J 11/04* (2013.01)

(58) Field of Classification Search
USPC .................................. 524/491, 558
See application file for complete search history.

(56) References Cited

U.S. PATENT DOCUMENTS

| | | | |
|---|---|---|---|
| 2011/0207855 A1* | 8/2011 | Suau ................ | C04B 24/2647 524/5 |
| 2014/0178485 A1 | 6/2014 | Champagne et al. | |
| 2016/0222188 A1 | 8/2016 | Bardin et al. | |

FOREIGN PATENT DOCUMENTS

| | | |
|---|---|---|
| FR | 3 010 409 A1 | 3/2015 |
| WO | 2014/096622 A1 | 6/2014 |

OTHER PUBLICATIONS

Nov. 16, 2016 Search Report issued in International Patent Application No. PCT/FR2016/052220.
Nov. 16, 2016 Written Opinion issued in International Patent Application No. PCT/FR2016/052220.

* cited by examiner

*Primary Examiner* — Fred M Teskin
(74) *Attorney, Agent, or Firm* — Oliff PLC

(57) ABSTRACT

Composition including at least one hydrocarbon-containing cut of petroleum origin or obtained from biomass conversion (a) and at least one copolymer (b) resulting from the copolymerization of: at least one monomer selected from: acrylic acid and any salt thereof, optionally at least one monomer selected from: methacrylic acid and any salt thereof, at least one monomer selected from the monomers of formula (I):

$$R-X-R' \qquad (I)$$

according to which R represents a polymerizable unsaturated function, R' denotes hydrogen or an alkyl group having from 1 to 4 carbon atoms, X represents a structure including n unit(s) of ethylene oxide EO and m unit(s) of propylene oxide PO, m and n are two integers in the range from 0 to 150, at least one of which is not zero.

19 Claims, No Drawings

PLASTICIZER FOR ACRYLIC MASTICS AND ADHESIVES

FIELD OF THE INVENTION

The invention relates to a composition comprising at least one hydrocarbon-containing cut and a copolymer, said composition being usable in the formulation of acrylic mastics and adhesives.

The present invention relates to a phthalate-free composition usable as a plasticizer for acrylic mastics and adhesives.

The present invention also relates to a composition of acrylic mastic and a composition of acrylic adhesive comprising said plasticizer composition.

The present invention also relates to the use of said composition as a plasticizer for formulating acrylic mastics and adhesives.

TECHNICAL CONTEXT OF THE INVENTION

Numerous products are used in building materials, for example for floor coverings, mastics or for seals of sanitary fittings. Addition of plasticizers is common in certain classes of mastics such as hybrid mastics (based on modified silicone polymers), acrylic mastics, polyurethane mastics, Plastisols (PVC paste) and certain adhesives. A plasticizer is a molecule or an oligomer, in the solid state or in the liquid state, of variable viscosity, added to the formulations of various types of materials to make them more flexible, stronger, more pliable or easier to manipulate.

An ideal plasticizer is compatible with the polymer matrix to avoid phenomena of migration, of low volatility, difficulty extractable by liquids that will be in contact with the plasticized material, having good performance with respect to certain properties such as flexibility, resistant to impacts, cold and heat, and having good electrical resistivity. It will not oxidize and will be nontoxic, odorless, colorless and inexpensive.

Phthalates are products that are widely used as plasticizers. Increasing regulatory pressure restricts their uses in many countries owing to their hazardousness for humans. Alternatives to their use are therefore very necessary now.

Moreover, recent regulatory constraints due to the limitations on volatile organic compounds (VOCs) in building materials must also be taken into account. In fact, these compounds have a tendency to evaporate and/or degrade either immediately, or over time, and be a source of emissions that are often toxic for the environment and more particularly for human and animal health. These emissions surrounding everyday life constitute an important source of interior pollution of dwellings, offices and public buildings and any closed space with limited ventilation. These emissions may be considerable at the time of placing the materials but there may also be a long-term effect owing to persistent volatility as a function of time or even associated with gradual degradation of the covering, adhesive composition or mastic.

Hydrocarbon-containing solvents currently represent one of the potential alternatives for replacing phthalates. Now, the use of hydrocarbon-containing solvents, without phthalates depending on their nature, directly as plasticizers in formulations of acrylic mastics and adhesives has so far been of limited application, through lack of compatibility. In fact there is generally migration of the solvent to the surface, otherwise called sweating. This lack of compatibility is made worse by the use of hydrocarbon-containing solvents of high molecular weight.

Owing to increasingly stringent regulatory constraints, a technical solution is required to allow replacement of phthalates in stable, economically advantageous formulations of building materials.

These regulatory constraints also require a technical solution that allows replacement of phthalates in stable, economically advantageous formulations of building materials with low levels of VOCs.

Thus, there is still a need to improve the compatibility of the hydrocarbon-containing solvents in polymer formulations such as those of mastics and adhesives.

A phthalate-free plasticizer, with low levels of VOCs and partly of renewable origin, is known from document FR 3 010 409. The plasticizer described comprises at least one hydrocarbon-containing cut or one obtained from biomass conversion and at least one fatty acid monoester. This plasticizer is used in particular in hybrid mastics (based on modified silicone polymers), in PVC pastes and in adhesives based on EVA.

Document WO 2014/096622 describes particles that are able to release an active agent, these microparticles with a polymer envelope comprising at least one acrylic copolymer of the HASE type, at least one material with liquid-solid phase change and at least one active ingredient. The acrylic copolymers described may be obtained from an anionic monomer such as acrylic acid, a nonionic hydrophobic monomer that may be acrylates and an alkoxylated macromonomer bearing a chain comprising at least six carbon atoms. The technical problem forming the basis of WO 2014/096622 consists of encapsulating one or more active agents so that they can be released subsequently.

One of the applicant's main aims is therefore to propose a phthalate-free composition, for formulating building materials such as acrylic mastics and adhesives.

Another of the applicant's aims is to propose a composition for formulating acrylic mastics and adhesives that do not display sweating, or display acceptable sweating that is compatible with uses in acrylic mastics and adhesives.

Another of the applicant's aims is to propose a composition usable as a plasticizer that is compatible with use for formulating acrylic mastics and adhesives.

Another of the applicant's aims is also to obtain a composition usable as a plasticizer with non-VOC character, for formulating building materials, materials based on resins or materials used in the automotive sector such as mastics, and certain types of acrylic adhesives.

One of the applicant's aims is thus to improve the compatibility between the polymer matrix of acrylic mastics and adhesives and a hydrocarbon-containing solvent. In practice, it is therefore a matter of limiting or eliminating the phenomena of sweating and exudation but also of reducing the emission of VOCs, by creating chemical affinity between the solvent and the polymer.

SUMMARY OF THE INVENTION

These aims are achieved thanks to a novel composition.
The invention relates to a composition comprising at least one hydrocarbon-containing cut (a) of petroleum origin or obtained from biomass conversion and at least one copolymer (b) resulting from the copolymerization of:
  at least one monomer selected from: acrylic acid and any salt thereof, optionally at least one monomer selected from: methacrylic acid and any salt thereof,
at least one monomer selected from the monomers of formula (I):

R—X—R' (I)

according to which:
R represents a polymerizable unsaturated function,
R' denotes hydrogen or an alkyl group having from 1 to 4 carbon atoms,
X represents a structure comprising n unit(s) of ethylene oxide EO and m unit(s) of propylene oxide PO,
m and n are two integers in the range from 0 to 150, at least one of which is not zero.

Preferably, the composition of the invention comprises a content of hydrocarbon-containing cut (a) from 60 to 90 wt %, preferably from 65 to 85 wt % and more preferably from 70 to 80 wt % relative to the total weight of the composition.

Preferably, the hydrocarbon-containing cut (a) of the composition of the invention is a dearomatized hydrocarbon-containing cut.

Preferably, the hydrocarbon-containing cut (a) of the composition of the invention has a boiling point from 200 to 420° C., according to standard ASTM D86, a kinematic viscosity at 40° C. from 2 to 20 mm$^2$/s, according to standard ASTM D445 and/or a flow point from −45 to +10° C., according to standard ASTM D97.

Preferably, the hydrocarbon-containing cut (a) of the composition of the invention comprises a content by weight, relative to the total weight of the hydrocarbon-containing cut: of paraffins from 60 to 99%, of naphthenes from 1 to 40% and a content of aromatic compounds less than or equal to 300 ppm.

Advantageously, the composition of the invention comprises a content of copolymer (b) from 10 to 40 wt %, preferably from 15 to 35% and more preferably from 20 to 30 wt % relative to the total weight of the composition.

Preferably, in formula (I), m and n are two integers selected from the group from 1 to 150.

According to one embodiment, the composition of the invention comprises at least one copolymer (b) resulting from the copolymerization of a set of monomers consisting of, by weight relative to the total weight of monomers:
at most 20% of at least one monomer selected from: acrylic acid and any salt thereof,
from 0 to 10% of monomers selected from: methacrylic acid and any salt thereof, and
at least 80% of monomers of formula (I).

According to a second embodiment, the composition of the invention comprises at least two copolymers (b) resulting from the copolymerization of a set of monomers:
b1) at least one copolymer consisting of monomers of acrylic acid and/or any salt thereof, of monomers of formula (I):

R—X—R' (I)

according to which R represents a polymerizable unsaturated function, R' denotes hydrogen or an alkyl group having from 1 to 4 carbon atoms, X represents a structure comprising n unit(s) of ethylene oxide EO and m unit(s) of propylene oxide PO, m and n are two integers in the range from 0 to 150, at least one of which is not zero
b2) at least one copolymer consisting of monomers of acrylic acid and/or any salt thereof, of monomers of methacrylic acid and/or any salt thereof, of monomers of formula (I'):

R''—X'—R''' (I')

according to which R'' represents a polymerizable unsaturated function, R''' denotes hydrogen or an alkyl group having from 1 to 4 carbon atoms, X' represents a structure comprising n' unit(s) of ethylene oxide EO and m' unit(s) of propylene oxide PO, m' and n' are two integers in the range from 0 to 150, at least one of which is not zero.

Advantageously, copolymer b1) of the composition of the invention has a molecular weight Mw from 20 000 to 80 000 g/mol and copolymer b2) of the composition of the invention has a molecular weight Mw greater than or equal to 500 000 g/mol.

Preferably, the composition of the invention comprises a content of phthalates less than or equal to 1 wt % relative to the total weight of the composition.

Ideally, the composition of the invention is a plasticizer composition for acrylic mastics and adhesives.

The invention also relates to a composition of acrylic mastic comprising a content by weight of the composition of the invention from 1 to 20% relative to the total weight of the composition of acrylic mastic.

Preferably, the mastic composition comprises, by weight relative to the total weight of the composition: from 0 to 60% of at least one filler, from 10 to 88% of at least one acrylic polymer or copolymer in aqueous dispersion, from 10 to 40% of water, from 1 to 5% of at least one surfactant and from 1 to 20% of at least one composition of the invention.

The invention further relates to a composition of acrylic adhesive comprising a content by weight of the composition of the invention from 1 to 20% relative to the total weight of the composition of acrylic adhesive.

Preferably, the adhesive composition comprises, by weight relative to the total weight of the composition: from 0 to 60% of at least one filler, from 10 to 88% of at least one acrylic polymer or copolymer in aqueous dispersion, from 10 to 40% of water, from 1 to 5% of at least one surfactant and from 1 to 20% of at least one composition of the invention.

The invention also further relates to the use of the composition of the invention in acrylic mastics and adhesives, advantageously as a plasticizer.

DETAILED DESCRIPTION OF THE INVENTION

The invention relates to a composition comprising at least one hydrocarbon-containing cut obtained from crude oil or a hydrocarbon-containing cut obtained from biomass conversion and at least one copolymer of the comb type.

The invention relates in particular to a composition comprising at least one hydrocarbon-containing cut of petroleum origin or obtained from biomass conversion, and at least one copolymer consisting of monomers of acrylic acid and/or any salt thereof, optionally of monomers of methacrylic acid and/or any salt thereof, and monomers of formula (I):

R—X—R' (I)

according to which:
R represents a polymerizable unsaturated function,
R' denotes hydrogen or an alkyl group having from 1 to 4 carbon atoms,
X represents a structure comprising n unit(s) of ethylene oxide EO and m unit(s) of propylene oxide PO, arranged randomly or regularly,
m and n are two integers in the range from 0 to 150, at least one of which is not zero.

The composition according to the invention comprises in particular a hydrocarbon-containing cut and at least one copolymer of the comb type usable as a plasticizer and making it possible to obtain a composition of acrylic mastics or adhesives without sweating.

The composition according to the invention comprises in particular a hydrocarbon-containing cut and at least one copolymer of the comb type, usable as a plasticizer, and making it possible to obtain a composition of acrylic mastics or adhesives having good mechanical properties.

The composition according to the invention comprises in particular a hydrocarbon-containing cut enabling the regulatory constraints to be met concerning the limitations on volatile organic compounds or VOCs.

The Hydrocarbon-containing Cut:

The composition according to the invention comprises at least one hydrocarbon-containing cut, also called hydrocarbon-containing solvent.

The hydrocarbon-containing cut according to the invention preferably has a content by weight of paraffin compounds from 60% to 99%, preferably from 65% to 95%, even more preferably from 70% to 90%. These paraffins may be mixtures.

The hydrocarbon-containing cut according to the invention advantageously comprises a majority of isoparaffins and a minority of normal paraffins. Preferably the content of isoparaffins in the hydrocarbon-containing cut is greater than or equal to 50 wt %. Preferably the content of normal paraffins in the hydrocarbon-containing cut is less than or equal to 30 wt %.

The hydrocarbon-containing cut according to the invention also preferably has a content by weight of naphthenic compounds from 1% to 40%, preferably from 5% to 35%, even more preferably from 10 to 30%. The naphthenes are saturated cyclic hydrocarbons.

According to a preferred embodiment, the hydrocarbon-containing cut comprises a content by weight of isoparaffins from 40% to 90%, of normal paraffins from 1% to 35% and of naphthenes from 1% to 40%. Preferably, the hydrocarbon-containing cut comprises a content by weight of isoparaffins from 50% to 80%, of normal paraffins from 5% to 30% and of naphthenes from 10% to 35%. More preferably, the hydrocarbon-containing cut comprises a content by weight of isoparaffins from 50% to 70%, of normal paraffins from 10% to 25% and of naphthenes from 10% to 30%.

According to a second embodiment, the hydrocarbon-containing cut is free from normal paraffins. "Free from normal paraffins" means a content of normal paraffins less than or equal to 1 wt %. Preferably the hydrocarbon-containing cut comprises a content by weight of isoparaffins from 50 to 99%, from 0 to 1% of normal paraffins and from 1 to 40% of naphthenes. More preferably the hydrocarbon-containing cut comprises a content by weight of isoparaffins from 60 to 90%, from 0 to 1% of normal paraffins and from 10 to 35% of naphthenes. Even more preferably, the hydrocarbon-containing cut comprises a content by weight of isoparaffins from 70 to 80%, from 0 to 1% normal paraffins and from 15 to 30% of naphthenes.

The hydrocarbon-containing cut employed in the composition according to the invention is advantageously free from aromatics. "Free from aromatics" means, preferably, a hydrocarbon-containing cut comprising a content of aromatic compounds less than or equal to 300 ppm, preferably less than or equal to 200 ppm, even more preferably less than or equal to 150 ppm, measured by UV spectrometry.

According to one embodiment the hydrocarbon-containing cut preferably comprises a content by weight of paraffins from 60 to 99%, of naphthenes from 1 to 40% and an aromatics content less than or equal to 300 ppm. Preferably, the hydrocarbon-containing cut comprises a content by weight of paraffins from 65 to 95%, of naphthenes from 5 to 35% and an aromatics content less than or equal to 200 ppm. Even more preferably, the hydrocarbon-containing cut comprises a content by weight of paraffins from 70 to 90%, of naphthenes from 10 to 30% and an aromatics content less than or equal to 150 ppm.

The hydrocarbon-containing cut also preferably has a sulfur content less than or equal to 10 ppm and preferably less than or equal to 2 ppm.

The hydrocarbon-containing cut according to the invention preferably has a kinematic viscosity at 40° C. from 2 to 20 $mm^2/s$, preferably from 2 to 15 $mm^2/s$ and more preferably from 3 to 10 $mm^2/s$ according to standard ASTM D445.

The hydrocarbon-containing cut according to the invention preferably has a typical flow point according to standard ASTM D97 from −45 to +10° C., preferably from −40 to 0° C. and more preferably from −35 to 0° C.

Advantageously, the hydrocarbon-containing cut according to the invention is free from volatile organic compounds (VOCs) at room temperature, thus complying with European Directive 1999/13. "Free from volatile organic compounds" means a hydrocarbon-containing cut having a vapor pressure less than or equal to 0.01 kPa at 20° C.

These compositions of hydrocarbon-containing cuts may be obtained as follows. The hydrocarbon-containing cut according to the invention is a hydrocarbon-containing cut that may be obtained in a known manner from crude oil or biomass.

Preferably, hydrocarbon-containing cut means, in the sense of the invention, a cut resulting from the distillation of crude oil, preferably resulting from atmospheric distillation and/or vacuum distillation of crude oil, preferably resulting from atmospheric distillation followed by vacuum distillation.

The hydrocarbon-containing cut employed in the composition of the invention is advantageously obtained by a method comprising steps of hydrotreating, hydrocracking or catalytic cracking.

The hydrocarbon-containing cut employed in the composition of the invention is preferably obtained by a method comprising steps of dearomatization and optionally desulfurization.

The hydrocarbon-containing cut according to the invention may also preferably be submitted to a step of hydrodewaxing.

Preferably, the hydrocarbon-containing cut obtained after the step or steps of distillation is a gas oil cut. This gas oil cut is preferably obtained by a method comprising steps of hydrotreating, hydrocracking, catalytic cracking or hydrodewaxing, optionally followed by steps of dearomatization and optionally desulfurization.

The hydrocarbon-containing cut may be a mixture of hydrocarbon-containing cuts that have undergone the steps described above.

The hydrocarbon-containing cut employed in the composition of the invention may also preferably be obtained from biomass conversion.

"Obtained from biomass conversion" means a hydrocarbon-containing cut produced starting from raw materials of biological origin preferably selected from vegetable oils, animal fats, fish oils and mixtures thereof. Suitable raw materials of biological origin are for example colza oil, canola oil, tall oil, sunflower oil, soybean oil, hempseed oil, olive oil, linseed oil, mustard oil, palm oil, groundnut oil, castor oil, coconut oil, animal fats such as tallow, recycled edible fats, raw materials resulting from genetic engineering, and biological raw materials produced from microorganisms such as algae and bacteria.

Preferably, the hydrocarbon-containing cut of biological origin is obtained by a method comprising steps of hydrodeoxygenation (HDO) and isomerization. The hydrodeoxygenation (HDO) step leads to decomposition of the structures of the biological esters or of the triglyceride constituents, removal of the oxygen-containing, phosphorus-containing and sulfur-containing compounds and hydrogenation of the olefinic bonds. The product resulting from the hydrodeoxygenation reaction is then isomerized. A fractionation step may preferably follow the steps of hydrodeoxygenation and isomerization.

The fractions of interest are then submitted to steps of hydrotreating and then distillation in order to obtain the specifications of the desired hydrocarbon-containing cut according to the invention.

The hydrocarbon-containing cut may be a mixture of hydrocarbon-containing cut obtained from distillation of crude oil and/or from biomass conversion.

Preferably the hydrocarbon-containing cut is a hydrocarbon-containing cut obtained from distillation of crude oil.

Advantageously the hydrocarbon-containing cut is a hydrogenated hydrocarbon-containing cut.

The hydrocarbon-containing cut employed in the composition of the invention is advantageously a hydrocarbon-containing cut having a distillation range DR (in ° C.) from 200 to 420° C., preferably from 220 to 400° C. and even more preferably from 240 to 380° C. measured according to standard ASTM D86. Preferably, the difference between the initial boiling point and the final boiling point is less than or equal to 100° C. The hydrocarbon-containing cut may comprise one or more fractions with distillation ranges within the ranges described above.

According to one embodiment, the hydrocarbon-containing cut preferably has:
- a boiling point from 200 to 420° C., preferably from 220 to 400° C. and even more preferably from 240 to 380° C., measured according to standard ASTM D86,
- a kinematic viscosity from 2 to 20 mm$^2$/s, preferably from 2 to 15 mm$^2$/s and more preferably from 3 to 10 mm$^2$/s according to standard ASTM D445, and
- a typical flow point according to standard ASTM D97 from −45 to +10° C., preferably from −40 to 0° C. and more preferably from −35 to 0° C.

According to another embodiment, the hydrocarbon-containing cut preferably has:
- a boiling point from 200 to 420° C., preferably from 220 to 400° C. and even more preferably from 240 to 380° C., measured according to standard ASTM D86 and
- a kinematic viscosity from 2 to 20 mm$^2$/s, preferably from 2 to 15 mm$^2$/s and more preferably from 3 to 10 mm$^2$/s according to standard ASTM D445.

According to a third embodiment, the hydrocarbon-containing cut preferably has:
- a kinematic viscosity from 2 to 20 mm$^2$/s, preferably from 2 to 15 mm$^2$/s and more preferably from 3 to 10 mm$^2$/s according to standard ASTM D445, and
- a typical flow point according to standard ASTM D97 from −45 to +10° C., preferably from −40 to 0° C. and more preferably from −35 to 0° C.

Advantageously, the composition according to the invention comprises a content of hydrocarbon-containing cut from 60 to 90 wt %, preferably from 65 to 85 wt % and even more preferably from 70 to 80 wt % relative to the total weight of the composition.

Copolymer of the Comb Type

The composition according to the invention comprises at least one copolymer of the comb type which makes it possible to improve the compatibility of the hydrocarbon-containing cut with the acrylic polymer when formulating acrylic mastics and adhesives.

The copolymer according to the invention is a water-soluble copolymer of the comb type having an acrylic acid, and optionally methacrylic acid, backbone and poly(alkylene glycol) side chains.

"Poly(alkylene glycol)" means a polymer of an alkylene glycol derived from an olefinic oxide.

The poly(alkylene glycol) chains of the copolymer according to the present invention contain a proportion of ethylene-oxy groups and/or a proportion of propylene-oxy groups.

The poly(alkylene glycol) chains according to the present invention may for example comprise a proportion of ethylene-oxy groups and a proportion of propylene-oxy groups, for example a dominant proportion of ethylene-oxy groups together with a secondary proportion of propylene-oxy groups. Specific examples of alkylene glycol polymer comprise: the poly(alkylene glycols) having an average molecular weight of 1000, 4000, 6000, 10 000 and 20 000 g/mol; the polyethylene polypropylene glycols having a percentage of ethylene oxide between 20 and 80 wt % and a percentage of propylene oxide between 20 and 80 wt %.

It should be noted that the ethylene-oxy groups and the propylene-oxy groups of the side chains of the copolymer may be arranged randomly, regularly or in a block.

More precisely, the polymer according to the present invention results from the polymerization of:
- monomers of acrylic acid and/or any salt thereof,
- optionally monomers of methacrylic acid and/or any salt thereof,
- monomers of formula (I):

$$R-X-R' \qquad (I)$$

according to which:
- R represents a polymerizable unsaturated function, notably acrylate, methacrylate, methacryl-urethane, vinyl or allyl,
- R' denotes hydrogen or an alkyl group having from 1 to 4 carbon atoms,
- X represents a structure comprising n unit(s) of ethylene oxide EO and m unit(s) of propylene oxide PO, arranged randomly or regularly,
- m and n are two integers in the range from 0 to 150, at least one of which is not zero.

Thus, according to one embodiment of the invention, the copolymer consists of acrylic acid monomers, and optionally of methacrylic acid monomers, and of monomers (I). According to this embodiment, the minimum content of monomers of acrylic acid is for example 4 wt %, 5 wt % or 6 wt %, as a function of the length of the alkoxylated chain of monomers (I).

According to another embodiment of the invention, the copolymer consists of monomers of acrylic acid and monomers (I) exclusively.

According to yet another embodiment of the invention, the copolymer consists of monomers of methacrylic acid, monomers of acrylic acid and monomers (I). According to this embodiment, the content by weight of monomers of acrylic acid is greater than the content by weight of monomers of methacrylic acid.

Thus, the use of a copolymer consisting exclusively of monomers (I) and monomers of methacrylic acid is excluded in the context of the present invention.

Said copolymer is obtained by the known methods of conventional radical copolymerization in solution, in bulk, in direct or inverted emulsion, in suspension or by precipitation in suitable solvents, in the presence of known catalytic systems and transfer agents, or else by methods of controlled radical polymerization such as the method known under the name of reversible addition-fragmentation chain transfer (RAFT), the method known by the name of atom transfer radical polymerization (ATRP), the method known by the name of nitroxide-mediated polymerization (NMP), or else the method known by the name of cobaloxime-mediated radical polymerization.

It is obtained in an acidic form and is optionally distilled. It may also be neutralized partially or completely with one or more neutralizing agents selected from the hydroxides of sodium, calcium, magnesium and potassium and mixtures thereof or selected from the amines.

According to one embodiment of the present invention, said copolymer is 100% neutralized with sodium hydroxide.

According to another embodiment of the present invention, said copolymer is partially neutralized with sodium hydroxide.

According to one embodiment, the composition of the present invention comprises at least one copolymer consisting of:
monomers of acrylic acid and/or any salt thereof,
optionally monomers of methacrylic acid and/or any salt thereof,
monomers of formula (I):

R—X—R'   (I)

according to which:
R represents an acrylate or methacrylate function,
R' denotes hydrogen or a methyl group,
X represents a structure comprising n unit(s) of ethylene oxide EO and m unit(s) of propylene oxide PO, arranged randomly or regularly,
m and n are two integers from 1 to 150.

According to this embodiment, the poly(alkylene glycol) chains of the copolymer, a constituent of the plasticizer according to the present invention, comprise a proportion of ethylene-oxy groups and a proportion of propylene-oxy groups.

According to another embodiment, the copolymer of the comb type according to the invention comprises a content of monomers of acrylic acid, of monomers of formula (I) and of monomers of methacrylic acid greater than or equal to 95 wt % relative to the weight of the copolymer, preferably greater than or equal to 98%.

According to another embodiment, the copolymer of the comb type consists, relative to the total weight of the copolymer, of:
at most 20 wt % of monomers of acrylic acid and/or any salt thereof,
from 0 to 10 wt % of monomers of methacrylic acid and/or any salt thereof, and
at least 80 wt % of monomers of formula (I).

According to yet another embodiment, said composition comprises two copolymers:
b1) a copolymer consisting of:
monomers of acrylic acid and/or any salt thereof,
monomers of formula (I):

R—X—R'   (I)

according to which:
R represents a polymerizable unsaturated function,
R' denotes hydrogen or an alkyl group having from 1 to 4 carbon atoms,
X represents a structure comprising n unit(s) of ethylene oxide EO and m unit(s) of propylene oxide PO, arranged randomly or regularly,
m and n are two integers in the range from 0 to 150, at least one of which is not zero
b2) a copolymer consisting of:
monomers of acrylic acid and/or any salt thereof,
monomers of methacrylic acid and/or any salt thereof,
monomers of formula (I'):

R"—X'—R'''   (I)

according to which:
R" represents a polymerizable unsaturated function,
R''' denotes hydrogen or an alkyl group having from 1 to 4 carbon atoms,
X' represents a structure comprising n' unit(s) of ethylene oxide EO and m' unit(s) of propylene oxide PO, arranged randomly or regularly,
m' and n' are two integers from 0 to 150, at least one of which is not zero.

According to this embodiment, the composition according to the invention comprises a combination of two copolymers of the comb type. These two copolymers may be used in all proportions. Moreover, it is also possible in the context of the present invention to use more than two copolymers, for example three copolymers of the comb type.

According to a particular embodiment, the composition according to the present invention comprises two copolymers of different molecular weights Mw:
copolymer b1) has a molecular weight from 20 000 to 80 000 g/mol, and
copolymer b2) has a molecular weight greater than or equal to 500 000 g/mol.

The weight-average molecular weights (Mw) of the copolymers according to the invention are determined by the techniques known by a person skilled in the art. For example, it can be determined by size exclusion chromatography (SEC). A precise protocol for determining the molecular weight of the copolymers according to the invention is given in the experimental section.

Advantageously, the composition according to the invention comprises a content of at least one copolymer as described above from 10 to 40 wt %, preferably from 15 to 35 wt % and even more preferably from 20 to 30 wt % relative to the total weight of the composition.

Plasticizer Composition:

The composition according to the invention is advantageously usable as a plasticizer in formulations of acrylic mastics and adhesives.

The plasticizer composition according to the invention advantageously comprises a content by weight of at least one hydrocarbon-containing cut (a) as described above from 60% to 90% and a content by weight of at least one copolymer (b) as described above from 10% to 40% relative to the total weight of the composition. Preferably the plasticizer composition according to the invention comprises a content by weight of hydrocarbon-containing cut (a) from 65 to 85% and a content by weight of copolymer (b) from 15% to 35%, as described above, relative to the total weight of the composition. More preferably, it comprises a content by weight of hydrocarbon-containing cut (a) from 70% to 80% and of copolymer (b) from 20% to 30%, as described above, relative to the total weight of the composition.

Advantageously, the plasticizer composition according to the invention consists essentially of at least one hydrocarbon-containing cut (a) as described above at a content by weight from 60% to 90% and at least one copolymer (b) as described above at a content by weight from 10% to 40% relative to the total weight of the composition. Preferably the plasticizer composition according to the invention consists essentially of at least one hydrocarbon-containing cut (a) at a content by weight from 65 to 85% and at least one copolymer (b) at a content by weight from 15% to 35%, as described above, relative to the total weight of the composition. More preferably, it consists essentially of at least one hydrocarbon-containing cut (a) at a content by weight from 70% to 80% and at least one copolymer (b) at a content by weight from 20% to 30%, as described above, relative to the total weight of the composition.

Preferably, the plasticizer composition according to the invention is advantageously free from compounds of the phthalate type. "Free from phthalate compounds" means a composition comprising less than 1 wt % of phthalates, relative to the total weight of the composition, preferably less than 0.5%, more preferably less than 0.1%, even more preferably less than 0.01%.

Composition of Acrylic Mastic and Adhesives:

The invention also relates to a composition of acrylic mastic comprising a content by weight of the plasticizer composition according to the invention from 1 to 20 wt %, preferably from 5 to 15% and more preferably from 8 to 12% relative to the total weight of the composition of acrylic mastic.

Preferably, the composition of acrylic mastic comprises at least one other polymer in aqueous dispersion selected from the group consisting of a pure acrylic polymer, an acrylic copolymer, an acrylic styrene polymer, a polyvinylacetate polymer.

Advantageously the composition of acrylic mastic comprises a content by weight of said polymer in aqueous dispersion from 10 to 88%, preferably from 20 to 80% and more preferably from 30 to 70 wt % relative to the total weight of the composition of acrylic mastic.

These polymers and copolymers usable for formulating acrylic mastics and adhesives are known as such. When the polymer is an acrylic copolymer, it is different from the copolymers b) defined above.

To satisfy the mechanical and physicochemical requirements, the composition of acrylic mastic may also comprise conventionally at least one thickener, a filler, a crosslinking agent, a surfactant, water, and/or a catalyst.

The mastic composition preferably comprises a content by weight relative to the total weight of the composition from 0 to 60% of fillers, from 10 to 88% of polymers or of acrylic copolymers, from 10 to 40% of water, from 1 to 5% of surfactant and from 1 to 20% of the plasticizer composition according to the invention.

The mastic composition preferably comprises from 0 to 60% of fillers and/or of tackifying resins, from 10 to 88% of polymers or of acrylic copolymers, from 10 to 40% of water, from 1 to 5% of surfactant, from 0.5 to 10% of copolymer(s) b) and from 0.5 to 10% of hydrocarbon-containing cut a), the content being expressed by weight relative to the total weight of the composition.

Advantageously, the mastic composition comprises from 0.5 to 10% of copolymer(s) b) and from 0.5 to 10% of hydrocarbon-containing cut a) by weight relative to the total weight of the composition, more advantageously from 0.5 to 5% of copolymer(s) b) and from 4.5 to 10% of hydrocarbon-containing cut a), even more advantageously from 2 to 4% of copolymer(s) b) and from 5 to 9% of hydrocarbon-containing cut a), preferably from 2 to 3.5% of copolymer(s) b) and from 6 to 8.5% of hydrocarbon-containing cut a).

Even more preferably, the mastic composition consists essentially of 0 to 60% of fillers and/or of tackifying resins, 10 to 88% of polymers or of acrylic copolymers, 10 to 40% of water, 1 to 5% of surfactant, 0.5 to 10% of copolymer(s) b) and 0.5 to 10% of hydrocarbon-containing cut a), the content being expressed by weight relative to the total weight of the composition.

The invention also relates to a composition of acrylic adhesive comprising at least one polymer in aqueous dispersion selected from the group consisting of a polyethylene, a polypropylene or a polyamide, a copolymer of ethylene vinyl acetate.

In order to meet the mechanical and physicochemical requirements, the composition of acrylic adhesive may also comprise conventionally at least one thickener, a filler, a crosslinking agent, a surfactant, a tackifying resin, water, and/or a catalyst.

The composition of acrylic adhesive preferably comprises a content by weight relative to the total weight of the composition from 0 to 60% of fillers and/or of tackifying resins, from 10 to 88% of polymers or of acrylic copolymers, from 10 to 40% of water, from 1 to 5% of surfactant and from 1 to 20% of the plasticizer composition according to the invention.

The adhesive composition preferably comprises from 0 to 60% of fillers and/or of tackifying resins, from 10 to 88% of polymers or of acrylic copolymers, from 10 to 40% of water, from 1 to 5% of surfactant, from 0.5 to 10% of copolymer(s) b) and from 0.5 to 10% of hydrocarbon-containing cut a), the content being expressed by weight relative to the total weight of the composition.

Advantageously, the adhesive composition comprises from 0.5 to 10% of copolymer(s) b) and from 0.5 to 10% of hydrocarbon-containing cut a) by weight relative to the total weight of the composition, more advantageously from 0.5 to 5% of copolymer(s) b) and from 4.5 to 10% of hydrocarbon-containing cut a), even more advantageously from 2 to 4% of copolymer(s) b) and from 5 to 9% of hydrocarbon-containing cut a), preferably from 2 to 3.5% of copolymer(s) b) and from 6 to 8.5% of hydrocarbon-containing cut a).

Even more preferably, the adhesive composition consists essentially of 0 to 60% of fillers and/or of tackifying resins, 10 to 88% of polymers or of acrylic copolymers, 10 to 40% of water, 1 to 5% of surfactant, 0.5 to 10% of copolymer(s) b) and from 0.5 to 10% of hydrocarbon-containing cut a), the content being expressed by weight relative to the total weight of the composition.

The compositions of acrylic mastics and adhesives according to the invention have the remarkable characteristic that they contain less than 1 wt % of phthalates, preferably less than 0.5%, more preferably less than 0.1%, even more preferably less than 0.01% relative to the total weight of the composition.

The compositions of acrylic mastics and adhesives as described are advantageously phthalate-free and preferably have low levels of VOCs so as to comply with current regulatory requirements.

Use of the Composition:

The invention further relates to the use of the composition according to the invention in formulations of acrylic mastics and adhesives.

Use of a Comb Copolymer for Preparing a Plasticizer Composition:

The invention further relates to the use of at least one copolymer consisting of:
monomers of acrylic acid and/or any salt thereof,
optionally monomers of methacrylic acid and/or any salt thereof,
monomers of formula (I):

R—X—R'        (I)

according to which:
R represents a polymerizable unsaturated function,
R' denotes hydrogen or an alkyl group having from 1 to 4 carbon atoms,
X represents a structure comprising n unit(s) of ethylene oxide EO and m unit(s) of propylene oxide PO, arranged randomly or regularly,
m and n are two integers in the range from 0 to 150, at least one of which is not zero,
for preparing a plasticizer composition usable in formulations of acrylic mastics and adhesives.

Method:

The invention also relates to a method for improving the following properties, without being limited thereto, of the composition of acrylic mastic and adhesive comprising the plasticizer composition according to the invention: compatibility of the polymer matrix with the plasticizer, sweating, drying, emission of VOCs, and smooth, uniform surface.

According to one embodiment, the method of the invention comprises at least one step of incorporating the plasticizer composition according to the invention in a formulation of acrylic mastic.

According to a second embodiment, the method of the invention comprises at least one step of incorporating the plasticizer composition according to the invention in a formulation of acrylic adhesive.

EXAMPLES

In the rest of the present description, examples are given for purposes of illustrating the present invention, and they are not intended to limit its scope in any way.

Various formulations of acrylic mastics were evaluated.

The following examples describe the compositions of acrylic mastic in aqueous phase comprising a mixture of various copolymers and a hydrocarbon-containing cut, used as plasticizer composition:
a hydrocracked hydrocarbon-containing cut such as HYDROSEAL G400H marketed by the company TOTAL FLU IDES,
the copolymers XP 1934, XP 1935, XP 1936 and XP1937, made by the company COATEX.

Preparation of the Comb Copolymers

The water-soluble copolymers in the following examples are according to the invention or are not according to the invention. They have:
a negatively charged backbone made up of randomly polymerized monomers of acrylic acid and/or of methacrylic acid, and
uncharged side chains made up of poly(alkylene glycol) units.

XP1934 (not According to the Invention)

The copolymer XP1934 has the following composition (in wt % relative to the total weight of the copolymer):
7.4% of monomers of methacrylic acid,
92.6% of monomers of formula (I): R—X—R' in which R represents a methacrylate function, R' denotes hydrogen, X represents a structure comprising 46 units of ethylene oxide EO and 15 units of propylene oxide PO, arranged randomly.
Molecular weight: 130 000 g/mol
Partially neutralized with NaOH; pH: 4.0.
Dispersed at a content of 40 wt % of active material in water.

XP1935 (not According to the Invention)

The copolymer XP1935 has the following composition (in wt % relative to the total weight of the copolymer):
12.5% of monomers of methacrylic acid,
87.5% of monomers of formula (I): R—X—R' in which R represents a methacrylate function, R' denotes hydrogen, X represents a structure comprising 46 units of ethylene oxide EO and 15 units of propylene oxide PO, arranged randomly.
Molecular weight: 70 000 g/mol
Fully neutralized with NaOH; pH: 7.0
Dispersed at a content of 40 wt % of active material in water.

XP1936 (According to the Invention)

The copolymer XP1936 has the following composition (in wt % relative to the total weight of the copolymer):
12.8% of monomers of acrylic acid,
87.2% of monomers of formula (I): R—X—R' in which R represents a methacrylate function, R' denotes hydrogen, X represents a structure comprising 46 units of ethylene oxide EO and 15 units of propylene oxide PO, arranged randomly.
Molecular weight: 40 000 g/mol
Partially neutralized with NaOH; pH: 4.0.
Dispersed at a content of 40 wt % of active material in water.

XP1937 (According to the Invention)

The copolymer XP1937 has the following composition (in wt % relative to the total weight of the copolymer):
8% of monomers of acrylic acid,
2.8% of monomers of methacrylic acid,
89.2% of monomers of formula (I): R—X—R' in which R represents a methacrylate function, R' denotes hydrogen, X represents a structure comprising 46 units of ethylene oxide EO and 15 units of propylene oxide PO, arranged randomly.
Molecular weight: 1 300 000 g/mol
Partially neutralized with NaOH; pH: 6.
Dispersed at a content of 25 wt % of active material in water.

Measurement of the Weight-average Molecular Weight (Mw) of the Copolymers of the Comb Type The molecular weight of the copolymers of the comb type of the present invention is determined by size exclusion chromatography (SEC).

This technique employs WATERS™ liquid chromatography apparatus equipped with two detectors. One of these detectors combines static dynamic light scattering at an angle of 90° with viscometry measured with a VISCOTEK™ MALVERN™ viscosimeter detector. The other detector is a WATERS™ detector of refractometric concentration.

This liquid chromatography equipment is equipped with size exclusion columns suitably selected by a person skilled in the art in order to separate the different molecular weights of the polymers under investigation. The liquid phase for elution is an aqueous phase containing 1% of $KNO_3$.

In detail, according to a first step, the polymerization solution is diluted at 0.9% dry in the SEC eluent, which is a 1% solution of $KNO_3$. It is then filtered at 0.2 μm. 100 μL is then injected into the chromatography apparatus (eluent: 1% solution of $KNO_3$).

The liquid chromatography apparatus contains an isocratic pump (WATERS™ 515) with delivery set at 0.8 ml/min. The chromatography apparatus also comprises a furnace, which comprises the following system of columns in series: a precolumn of the type GUARD COLUMN ULTRAHYDROGEL WATERS™ with length of 6 cm and inside diameter of 40 mm, a linear column of the type ULTRAHYDROGEL WATERS™ with length of 30 cm and inside diameter of 7.8 mm and two columns ULTRAHYDROGEL 120 ANGSTROM WATERS™ with length of 30 cm and inside diameter of 7.8 mm. The detection system consists on the one hand of a refractometric detector of the type RI WATERS™ 410 and on the other hand a double detector viscosimeter and light scattering at an angle of 90° of the type 270 DUAL DETECTOR MALVERN™. The furnace is heated to a temperature of 55° C., and the refractometer is heated to a temperature of 45° C.

Compositions 1 to 4 are evaluated as a function of their appearance, sweating, drying, and viscosity of each of them as follows:

Appearance: assessment of the smooth, uniform appearance of the mastic

Sweating/migration: To evaluate sweating, the mastic is applied on a Bristol record card of the type Exacompta 13308E. After 6 days, the record card is checked periodically to see whether the hydrocarbon-containing cut migrates to the Bristol record card.

Appearance of the surface after drying (after 24 h): a surface that is dry and non-sticky to the touch is required after a drying time of 24 hours.

Viscosity: evaluation of the resistance of the formulation when it is mixed with a spatula. An increase in difficulty of mixing is correlated with an increase in the viscosity of the mastic composition.

TABLE 1

| Constituents | Chemical nature | Composition 1 (wt %) | Composition 2 (wt %) | Composition 3 (wt %) | Composition 4 (wt %) |
|---|---|---|---|---|---|
| Acronal V278* | Acrylic polymer in aqueous dispersion | 34.0 | 34.0 | 34.0 | 34.0 |
| XP 1934 | Copolymer | 2.3 | | | |
| XP 1935 | Copolymer | | 2.3 | | |
| XP 1936 | Copolymer | | | 2.3 | |
| XP 1937 | Copolymer | | | | 2.3 |
| NaOH** | For adjusting the pH | 0.3 | 0.3 | 0.3 | 0.3 |
| Hydroseal G400H | Hydrocarbon cut | 7 | 7 | 7 | 7 |
| Calcilit Extra | filler | 12.8 | 12.8 | 12.8 | 12.8 |
| Calcilit 9CG | filler | 43.6 | 43.6 | 43.6 | 43.6 |
| Weight ratio copolymer/(copolymer + hydrocarbon-containing cut) | | 0.25 | 0.25 | 0.25 | 0.25 |
| PROPERTIES | | | | | |
| Appearance | | Average | Good | Good | Good |
| Sweating | | Yes | Yes | No | No |
| Drying of the surface | | Dry | Dry | Dry | Dry |
| Viscosity | | High | High | Moderate | Moderate |

*Acronal V278: 65% of active material in aqueous dispersion.
**aqueous solution of soda with a concentration of 100 g/l The chromatography apparatus is calibrated with a single standard of PEO 19 k of the type PolyCAL™ MALVERN™.

First Series of Tests:

In this first series of tests, the various COATEX copolymers XP 1934, XP 1935, XP 1936 and XP 1937 are incorporated separately at a content of 2.3 wt % of aqueous dispersion of copolymer relative to the total weight of the composition.

Formulation of the Compositions of Acrylic Mastic

Table 1 presents the formulations as well as the chemical characteristics of the constituents of the 4 compositions of acrylic mastics and the results of the evaluation of each of these 4 compositions.

The percentages shown correspond to the weight of commercial substance or are by weight of aqueous dispersion of polymer relative to the total weight of the composition.

A positive response in the sweating test leads to exclusion of the copolymer tested. Thus, only compositions 3 and 4 comprising copolymers XP 1936 and XP 1937 respectively are retained in the rest of the experimental design. It is noted, moreover, that compositions 3 and 4 give a smooth, uniform appearance and a dry surface after 24 hours.

Second Series of Tests:

In a second series of tests, the copolymers XP 1934, XP 1935, XP 1936 and XP1937 were mixed in compositions of acrylic mastics.

Each composition comprises a content of 1.15 wt % of aqueous dispersion of each of the 2 copolymers mixed so as to obtain a total content of 2.3% of copolymer, equal to that of the first series of tests. The other constituents of the composition are the same as those of the first series of tests and in the same proportions as those in Table 1.

Table 2 presents the formulations of the constituents of the 6 compositions of acrylic mastics and the results of the evaluation of sweating, drying and viscosity of each of these 6 compositions.

TABLE 2

COMPOSITIONS

| Constituents | Composition 5 (wt %) Comparative | Composition 6 (wt %) According to the invention | Composition 7 (wt %) According to the invention | Composition 8 (wt %) According to the invention |
|---|---|---|---|---|
| Acronal V278* | 34.0 | 34.0 | 34.0 | 34.0 |
| XP 1934 | 1.15 | | | |
| XP 1935 | 1.15 | 1.15 | 1.15 | |
| XP 1936 | | 1.15 | | 1.15 |
| XP 1937 | | | 1.15 | 1.15 |
| NaOH (**) | 0.3 | 0.3 | 0.3 | 0.3 |
| Hydroseal G400H | 7 | 7 | 7 | 7 |
| Calcilit Extra | 12.8 | 12.8 | 12.8 | 12.8 |
| Calcilit 9CG | 43.6 | 43.6 | 43.6 | 43.6 |
| Weight ratio (***) (copol.)/(a) + (copol.) | 0.25 | 0.25 | 0.25 | 0.25 |

PROPERTIES

| | | | | |
|---|---|---|---|---|
| Drying of the surface | Dry | Dry | Dry | Dry |
| Sweating | Yes | No | No | No |
| Viscosity | Increase | Increase | Increase | No increase |

*Acronal V278: 65% of active material in aqueous dispersion.
(**) aqueous solution of soda with a concentration of 100 g/l
(***) Weight ratio of copolymer (b) or of comparative copolymer in the composition of hydrocarbon-containing cut (a) + copolymer, the composition being comparative or according to the invention It can be seen that composition 5, which employs a mixture of copolymers XP 1934 and XP 1935, leads to sweating, which makes the mixture unsuitable for the application. All the other compositions lead to absence of sweating. All these compositions employ a copolymer XP1936 and/or XP1937. The best results are obtained with the combination of copolymers XP 1936 and XP 1937. No sweating, no lack of drying or increase in viscosity are found.

Third Series of Tests:

In a third series of tests, the composition comprising the mixture of copolymer XP 1936 and XP 1937, which gave the best results in the second series of tests, was evaluated by varying the content of each of the two polymers in proportions ranging from 60/40 to 40/60.

Tables 3, 4 and 5 present the contents by weight of materials employed relative to the total weight of each composition, as well as the results of evaluation of the properties of each of the compositions.

The properties evaluated are: appearance of the composition, drying of the surface after 24 hours and sweating in the same conditions as in the first two series of tests.

In Table 3, the contents of copolymers XP 1936 and XP1937 vary by 0.2% respectively, increasing and decreasing so as to keep the total content of copolymer at a constant 2.3 wt % of dispersion of copolymer relative to the total weight of the composition.

All the compositions 9 to 15 of acrylic mastics display good properties, namely a smooth, uniform appearance before application, adequate drying after 24 hours and absence of sweating.

In Table 4, the contents of copolymers XP 1936 and XP1937 are strictly equivalent by weight of dispersion of copolymer relative to the total weight of the composition. The total weight of the constituents is adjusted by varying the content of calcite 9GC.

TABLE 3

| Constituents | C9 | C10 | C11 | C12 | C13 | C14 | C15 |
|---|---|---|---|---|---|---|---|
| COMPOSITIONS | | | | | | | |
| XP 1936 | 0.55 | 0.75 | 0.95 | 1.35 | 1.15 | 1.55 | 1.75 |
| XP 1937 | 1.75 | 1.55 | 1.35 | 0.95 | 1.15 | 0.75 | 0.55 |
| NaOH (**) | 0.3 | 0.3 | 0.3 | 0.3 | 0.3 | 0.3 | 0.3 |
| Hydroseal G400H | 7.0 | 7.0 | 7.0 | 7.0 | 7.0 | 7.0 | 7.0 |

TABLE 3-continued

| Constituents | C9 | C10 | C11 | C12 | C13 | C14 | C15 |
|---|---|---|---|---|---|---|---|
| Calcilit Extra | 12.8 | 12.8 | 12.8 | 12.8 | 12.8 | 12.8 | 12.8 |
| Calcilit 9CG | 43.6 | 43.6 | 43.6 | 43.6 | 43.6 | 43.6 | 43.6 |
| Acronal V278 (*) | 34.0 | 34.0 | 34.0 | 34.0 | 34.0 | 34.0 | 34.0 |
| Weight ratio (***) (b)/(a) + (b) | 0.16 | 0.16 | 0.16 | 0.16 | 0.16 | 0.16 | 0.16 |
| PROPERTIES | | | | | | | |
| Appearance | good | good | good | good | good | good | good |
| Drying of the surface | Dry | Dry | Dry | Dry | Dry | Dry | Dry |
| Sweating | no | no | no | no | no | no | no |

(*) Acronal V278: 65% of active material in aqueous dispersion.
(**) aqueous solution of soda with a concentration of 100 g/l
(***) Weight ratio of copolymer (b) in the composition of hydrocarbon-containing cut (a) + copolymer (b) according to the invention

TABLE 4

| Constituents | C16 | C17 | C18 | C19 | C20 | C21 | C22 |
|---|---|---|---|---|---|---|---|
| COMPOSITIONS | | | | | | | |
| XP 1936 | 1.05 | 1.15 | 1.25 | 1.35 | 1.45 | 1.55 | 1.65 |
| XP 1937 | 1.05 | 1.15 | 1.25 | 1.35 | 1.45 | 1.55 | 1.65 |
| NaOH (**) | 0.3 | 0.3 | 0.3 | 0.3 | 0.3 | 0.3 | 0.3 |
| Hydroseal G400H | 7.0 | 7.0 | 7.0 | 7.0 | 7.0 | 7.0 | 7.0 |

TABLE 4-continued

| Constituents | C16 | C17 | C18 | C19 | C20 | C21 | C22 |
|---|---|---|---|---|---|---|---|
| Calcilit Extra | 12.8 | 12.8 | 12.8 | 12.8 | 12.8 | 12.8 | 12.8 |
| Calcilit 9CG (q.s.) | 43.8 | 43.6 | 43.4 | 43.2 | 43.0 | 42.8 | 42.6 |
| Acronal V278 (*) | 34.0 | 34.0 | 34.0 | 34.0 | 34.0 | 34.0 | 34.0 |
| Weight ratio (***) (b)/(a) + (b) | 0.23 | 0.25 | 0.26 | 0.28 | 0.29 | 0.31 | 0.32 |
| PROPERTIES | | | | | | | |
| Appearance | good | good | good | good | good | good | good |
| Drying of the surface | Dry | Dry | Dry | Dry | Dry | Dry | Dry |
| Sweating | Slight sweating | no | no | no | no | no | Slight sweating |

(*) Acronal V278: 65% of active material in aqueous dispersion.
(**) aqueous solution of soda with a concentration of 100 g/l
(***) Weight ratio of copolymer (b) in the composition of hydrocarbon-containing cut (a) + copolymer (b) according to the invention The best results are obtained with the composition comprising from 1.15 to 1.55 wt % of each of the copolymers XP 1936 and XP 1937. The composition therefore comprises a total weight from 2.3 to 3.1% of dispersion of copolymers relative to the total weight of the composition. Although they display slight sweating, compositions 16 and 22 have acceptable results for use as mastic. Thus, a composition comprising a weight of 2.1% or of 3.3% of dispersion of copolymers relative to the total weight of the mastic composition is also conceivable.

In Table 5, the contents of polymers XP 1936 and XP 1937 vary by 0.1% respectively, decreasing and increasing so as to keep the total content of copolymer dispersion at a constant 2.9 wt % relative to the total weight of the composition.

TABLE 5

| | C 23 | C24 | C25 | C26 | C27 | C28 |
|---|---|---|---|---|---|---|
| COMPOSITIONS | | | | | | |
| XP 1936 | 1.55 | 1.65 | 1.75 | 1.35 | 1.25 | 1.15 |
| XP 1937 | 1.35 | 1.25 | 1.15 | 1.55 | 1.65 | 1.75 |
| NaOH (**) | 0.3 | 0.3 | 0.3 | 0.3 | 0.3 | 0.3 |
| Hydroseal G400H | 7.0 | 7.0 | 7.0 | 7.0 | 7.0 | 7.0 |
| Calcilit Extra | 12.8 | 12.8 | 12.8 | 12.8 | 12.8 | 12.8 |
| Calcilit 9CG | 43.6 | 43.6 | 43.6 | 43.6 | 43.6 | 43.6 |
| Acronal V278* | 34.0 | 34.0 | 34.0 | 34.0 | 34.0 | 34.0 |
| PROPERTIES | | | | | | |
| Appearance | good | good | good | good | good | good |
| Drying of the surface | Dry | Dry | Dry | Dry | Dry | Dry |
| Sweating | no | no | no | no | no | no |

*Acronal V278: 65% of active material in aqueous dispersion.
(**) aqueous solution of soda with a concentration of 100 g/l All the compositions 23 to 28 display good results, namely: a smooth, uniform appearance, a dry surface after 24 hours and absence of sweating.

Fourth Series of Tests:

Two formulations of acrylic mastic are compared: one comprising the composition according to the invention and the other comprising a phthalate plasticizer as reference.

The following examples describe the compositions of acrylic mastic evaluated. These compositions comprise the various compositions of plasticizers given below:

A composition comprising the copolymers XP 1936 and XP 1937 produced by the company COATEX in a mixture and a hydrocracked hydrocarbon-containing cut such as HYDROSEAL G400H marketed by the company TOTAL FLUIDES, example A according to the invention, A composition of diisodecyl phthalate (or DIDP) as reference for the phthalates such as Palatinol N marketed by the company BASF, comparative example B.

Formulation of the Compositions of Acrylic Mastic

Tables 6 and 7 present the chemical characteristics of the constituents of the acrylic mastics in aqueous phase used for the various evaluations, as well as their proportions.

The percentages shown correspond to the weight of commercial substance or to the weight of aqueous dispersion of polymer relative to the total weight of the composition.

TABLE 6

Composition of example A according to the invention

| Constituents | wt % | Chemical Nature |
|---|---|---|
| Acronal V278* | 34.0 | Acrylic polymer in aqueous dispersion |
| XP 1936 | 1.45 | Copolymer |
| XP 1937 | 1.45 | Copolymer |
| NaOH (c = 10%) | 0.3 | For adjusting the pH |
| Hydroseal G400H | 7 | Hydrocarbon cut |
| Calcilit Extra | 12.8 | filler |
| Calcilit 9CG | 43 | filler |

*Acronal V278: 65% of active material in aqueous dispersion.

TABLE 7

Composition of comparative example B

| Constituents | wt % | Chemical Nature |
|---|---|---|
| Acronal V278* | 34.0 | Acrylic polymer in aqueous dispersion |
| Disponil FES 77 | 1.0 | surfactant |
| Dispex N40 | 0.5 | surfactant |
| NaOH (c = 10%) | 0.3 | For adjusting the pH |
| Palatinol N (DIDP) | 7.0 | Plasticizer |
| Calcilit Extra | 12.8 | filler |
| Calcilit 9CG | 44.4 | filler |

*Acronal V278: 65% of active material in aqueous dispersion.

Results

The mechanical properties and compatibility of each of the compositions, A according to the invention and comparative composition B, were evaluated.

Table 8 presents the results obtained for the mechanical properties for each of the two compositions A and B of acrylic mastics with, as plasticizer, the composition according to the invention (example A) and the phthalate reference (comparative example B).

TABLE 8

| | Composition A according to the invention | Comparative composition B |
|---|---|---|
| Plasticizer composition | According to the invention | DIDP |
| Skin formation time (smoothing time) (in min) | 10-15 | 10-15 |
| Hardness Shore A after 28 days at room temperature (DIN ISO 7619) | 19 | 16 |

TABLE 8-continued

| | Composition A according to the invention | Comparative composition B |
|---|---|---|
| Resistance to shearing (application of the mastic on a wooden substrate) EN 281 after 3 days (in N/mm²) (DIN EN 14293) | 0.49 | 0.43 |
| Modulus of elasticity at 100% (2 mm film) after 28 days at room temperature (in N/mm²) (DIN 53504, S2) | 0.30 | 0.26 |
| Elongation at rupture after 28 days at room temperature (in %) (DIN 53504, S2) | 550 | 600 |

The results for the mechanical properties of composition A comprising the composition according to the invention are as good and comparable to those obtained with comparative composition B comprising the phthalate plasticizer.

Table 9 presents the results of compatibility for the different compositions A and B of acrylic mastics.

Five criteria are evaluated for determining the potential defects of the two compositions A and B:

Drying: the hardening of the mastic is evaluated by touch, 24 hours after application, Sweating: To evaluate sweating, the mastic is applied on a Bristol record card of the type Exacompta 13308E. After 6 days, the record card is checked periodically to see whether the hydrocarbon-containing cut migrates to the Bristol record card.

Adhesion/cohesion: The mastic is formulated and applied between 2 cemented surfaces. The variation of the composition is observed visually for 4 weeks at room temperature. Three types of result are possible: no problem, cohesive rupture (the mastic splits but does not detach from the cement), adhesive rupture (the mastic detaches from the cement).

Paintability: The mastic composition is applied on a window pane, and after drying for 24 hours the mastic is painted with a single layer of satin-finish acrylic paint. The painted surface is then evaluated: no change, discoloration, color change and/or crazing.

Stability in storage: The stability in storage is evaluated after 4 weeks at 45° C.

TABLE 9

| | Composition A Plasticizer according to the invention | Composition B Plasticizer: DIDP |
|---|---|---|
| Drying | yes | yes |
| Sweating | no | no |
| Adhesive/cohesive rupture | no | no |
| Paintability | yes | yes |
| Stability in storage | yes | yes |

It will be noted that the formulation of acrylic mastic comprising the composition according to the invention does not have any sweating or migration of the hydrocarbon-containing cut contained in the composition to the surface.

Moreover, the mechanical properties and compatibility of the acrylic mastic comprising the composition according to the invention are as good or even better than those of a mastic comprising the phthalate reference as plasticizer.

The invention claimed is:

1. A composition comprising:
   a) at least one hydrocarbon-containing cut of petroleum origin or obtained from biomass conversion, and
   b) at least one copolymer resulting from the copolymerization of:
      at least one monomer selected from: acrylic acid and any salt thereof,
      optionally at least one monomer selected from: methacrylic acid and any salt thereof,
      at least one monomer selected from the monomers of formula (I):

$$R\text{—}X\text{—}R' \qquad (I)$$

according to which:
   R represents a polymerizable unsaturated function,
   R' denotes hydrogen or an alkyl group having from 1 to 4 carbon atoms,
   X represents a structure comprising n unit(s) of ethylene oxide EO and m unit(s) of propylene oxide PO,
   m and n are two integers in the range from 0 to 150, at least one of which is not zero.

2. The composition as claimed in claim 1 that comprises a content of hydrocarbon-containing cut (a) from 60 to 90 wt % relative to the total weight of the composition.

3. The composition as claimed in claim 1 that comprises a content of hydrocarbon-containing cut (a) from 65 to 85 wt % relative to the total weight of the composition.

4. The composition as claimed in claim 1, in which the hydrocarbon-containing cut (a) is a dearomatized hydrocarbon-containing cut.

5. The composition as claimed in claim 1, in which the hydrocarbon-containing cut (a) has the following properties: a boiling point from 200 to 420° C., according to standard ASTM D86.

6. The composition as claimed in claim 1, in which the hydrocarbon-containing cut (a) has the following properties: a kinematic viscosity at 40° C. from 2 to 20 mm2/s, according to standard ASTM D445.

7. The composition as claimed in claim 1, in which the hydrocarbon-containing cut (a) has the following properties: a flow point from −45 to +10° C., according to standard ASTM D97.

8. The composition as claimed in claim 1, in which the hydrocarbon-containing cut (a) comprises a content by weight relative to the total weight of the hydrocarbon-containing cut (a):
   of paraffins from 60 to 99%,
   of naphthenes from 1 to 40%,
   of aromatic compounds less than or equal to 300 ppm.

9. The composition as claimed in claim 1, which comprises a content of copolymer (b) from 10 to 40 wt % relative to the total weight of the composition.

10. The composition as claimed in claim 1, which comprises a content of copolymer (b) from 15 to 35% relative to the total weight of the composition.

11. The composition as claimed in claim 1, in which m and n are two integers selected from the group from 1 to 150.

12. The composition as claimed in claim 1, which comprises at least one copolymer (b) resulting from the copolymerization of a set of monomers consisting of, by weight relative to the total weight of monomers:
   at most 20% of at least one monomer selected from: acrylic acid and any salt thereof,
   from 0 to 10% of monomers selected from: methacrylic acid and any salt thereof, and
   at least 80% of monomers of formula (I).

13. The composition as claimed in claim 1, which comprises at least two copolymers (b) resulting from the copolymerization of a set of monomers:
   b1) at least one copolymer consisting of:
   monomers of acrylic acid and/or any salt thereof,
   monomers of formula (I):

   R—X—R'  (I)

according to which:
   R represents a polymerizable unsaturated function,
   R' denotes hydrogen or an alkyl group having from 1 to 4 carbon atoms,
   X represents a structure comprising n unit(s) of ethylene oxide EO and m unit(s) of propylene oxide PO,
   m and n are two integers in the range from 0 to 150, at least one of which is not zero
   b2) at least one copolymer consisting of:
   monomers of acrylic acid and/or any salt thereof,
   monomers of methacrylic acid and/or any salt thereof,
   monomers of formula (I'):

   R''—X'—R'''  (I')

according to which:
   R'' represents a polymerizable unsaturated function,
   R''' denotes hydrogen or an alkyl group having from 1 to 4 carbon atoms,
   X' represents a structure comprising n' unit(s) of ethylene oxide EO and m' unit(s) of propylene oxide PO,
   m' and n' are two integers in the range from 0 to 150, at least one of which is not zero.

14. The composition as claimed in claim 13, in which:
   copolymer b1) has a molecular weight Mw from 20 000 to 80 000 g/mol, and
   copolymer b2) has a molecular weight Mw greater than or equal to 500 000 g/mol.

15. The composition as claimed in claim 1, which comprises a content of phthalates less than or equal to 1 wt % relative to the total weight of the composition.

16. A composition of acrylic mastic comprising a content by weight of the composition as claimed in claim 1 from 1 to 20 wt % relative to the total weight of the mastic composition.

17. The composition of mastic comprising a content by weight of the composition from 1 to 20 wt % relative to the total weight of the mastic composition, further comprising, by weight relative to the total weight of the composition:
   0 to 60% of at least one filler,
   10 to 88% of at least one acrylic polymer or copolymer in aqueous dispersion,
   10 to 40% of water,
   1 to 5% of at least one surfactant,
   1 to 20% of at least one composition as claimed in claim 1.

18. A composition of acrylic adhesive comprising a content by weight of the composition as claimed in claim 1 from 1 to 20 wt % relative to the total weight of the adhesive composition.

19. The composition of adhesive comprising a content by weight of the composition from 1 to 20 wt % relative to the total weight of the adhesive composition further comprising, by weight relative to the total weight of the composition:
   0 to 60% of at least one filler and/or of at least one tackifying resin,
   10 to 88% of at least one acrylic polymer or copolymer in aqueous dispersion,
   10 to 40% of water,
   1 to 5% of at least one surfactant,
   1 to 20% of at least one composition as claimed in claim 1.

* * * * *